United States Patent
Zhang et al.

(10) Patent No.: US 9,510,190 B2
(45) Date of Patent: *Nov. 29, 2016

(54) WIRELESS ACCESS POINT SECURITY FOR MULTI-HOP NETWORKS

(71) Applicant: APPLE INC., Cupertino, CA (US)

(72) Inventors: Hang Zhang, Nepean (CA); Peiying Zhu, Kanata (CA); Mo-Han Fong, L'Orignal (CA); Wen Tong, Ottawa (CA); Gamini Senarath, Nepean (CA); Derek Yu, Kanata (CA); David Steer, Nepean (CA)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/766,519

(22) Filed: Feb. 13, 2013

(65) Prior Publication Data

US 2013/0246784 A1    Sep. 19, 2013

Related U.S. Application Data

(63) Continuation of application No. 12/307,695, filed as application No. PCT/IB2007/001892 on Jul. 6, 2007, now Pat. No. 8,468,338.

(Continued)

(51) Int. Cl.
*H04L 29/06* (2006.01)
*H04W 12/02* (2009.01)
*H04W 88/08* (2009.01)

(52) U.S. Cl.
CPC .......... *H04W 12/02* (2013.01); *H04L 63/0428* (2013.01); *H04L 63/0464* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 5,748,736 A | 5/1998 | Mittra | |
| 8,468,338 B2 * | 6/2013 | Zhang et al. | 713/153 |

(Continued)

FOREIGN PATENT DOCUMENTS

| | | |
|---|---|---|
| JP | 2005295739 A | 10/2006 |
| WO | 2005/008360 A2 | 1/2005 |
| WO | 2007/053954 A1 | 5/2007 |

OTHER PUBLICATIONS

Apu Kapadia, "Routing with Confidence: Supporting Discretionary Routing Requirements in Policy Based Networks", Proceedings of the Fifth IEEE International Workshop on Policies for Distributed Systems and Networks, 2004, pp. 1-10.*

(Continued)

*Primary Examiner* — Benjamin Lanier
(74) *Attorney, Agent, or Firm* — Fay Kaplun & Marcin, LLP

(57) ABSTRACT

Security in wireless communication networks that employ relay stations to facilitate communications between base stations and mobile stations is enhanced. In one embodiment, resource information provided to one or more relay stations from a base station or another relay station is encrypted prior to being delivered to the one or more relay stations. Only authorized relay stations are allocated an appropriate key necessary to decrypt the resource information. As such, only appropriate relay stations are able to access and use the resource information to effect communications directly or indirectly between the base stations and the mobile stations. In certain embodiments, the resource information is delivered between the various base and relay stations using either unicast or multicast delivery techniques.

33 Claims, 16 Drawing Sheets

Related U.S. Application Data

(60) Provisional application No. 60/870,417, filed on Dec. 18, 2006, provisional application No. 60/863,873, filed on Nov. 1, 2006, provisional application No. 60/822,960, filed on Aug. 21, 2006, provisional application No. 60/806,641, filed on Jul. 6, 2006.

(56) References Cited

U.S. PATENT DOCUMENTS

| | | |
|---|---|---|
| 2004/0090943 A1 | 5/2004 | da Costa et al. |
| 2005/0135268 A1 | 6/2005 | Simon et al. |
| 2005/0201342 A1 | 9/2005 | Wilkinson et al. |
| 2007/0097945 A1 | 5/2007 | Wang et al. |
| 2007/0147620 A1 | 6/2007 | Zheng et al. |
| 2007/0153739 A1 | 7/2007 | Zheng |
| 2007/0258508 A1 | 11/2007 | Werb et al. |

OTHER PUBLICATIONS

Agre et al.; "Secure Nomadic Wireless Mesh (SnowMesh) 802.11 TGs ESS Mesh Networking Proposal;" IEEE 802.11-05/596rl, May 15, 2005, XP-007902206; pp. 1-56.

Extended Search Report in European Patent Application No. 07789479.8-1856 / 2041910, Apr. 24, 2013, pp. 1-8.

Rao et al.; "Detecting Malicious Packet Dropping Using Statistically Regular Traffic Patterns in Multihop Wireless Networks That Are Not Bandwidth Limited;" Global Telecommunications Conference, Dec. 2003 IEEE Globecom, vol. 5, ISBN: 0-7803-7974-8; pp. 2957-2961.

International Search Report from related Application No. PCT/IB2007/001892, mailed Jan. 4, 2008, pp. 1-4.

Messerges et al., "A Security Design For a General Purpose, Self-Organizing, Multihop Ad Hoc Wireless Network", Procceedings of the $1^{st}$ AMC Workshop Security of Ad Hoc and Senor Networks Fairfax, Virginia, 2003, 11 pages.

\* cited by examiner

WIRELESS ACCESS POINT SECURITY FOR MULTI-HOP NETWORKS

This application is continuation of U.S. patent application Ser. No. 12/307,695 entitled "WIRELESS ACCESS POINT SECURITY FOR MULTI-HOP NETWORKS" to Zhang et al., filed Jan. 6, 2009, which is a 35 U.S.C. 371 National Phase application based on PCT/IB2007/001892 filed Jul. 6, 2007, which claims priority to U.S. provisional patent application Ser. No. 60/806,641 filed Jul. 6, 2006; U.S. provisional patent application Ser. No. 60/822,960 filed Aug. 21, 2006; U.S. provisional patent application Ser. No. 60/863,873 filed Nov. 1, 2006; and U.S. provisional patent application Ser. No. 60/870,417 filed Dec. 18, 2006; the disclosures of which are incorporated herein by reference in their entireties.

FIELD OF THE INVENTION

The present invention relates to wireless communications, and particular to wireless communication systems that employ relay stations in a secure fashion.

BACKGROUND OF THE INVENTION

Certain wireless communication systems divide areas of coverage into cells, each of which has traditionally been served by a base station. The base stations support wireless communications with mobile stations. The coverage area provided by a given base station is generally referred to as a cell. As the mobile stations move from one cell to another, the communication sessions are transferred from one base station to another. Unfortunately, the coverage area for a base station can be limited and may vary based on geography and structures located within the coverage area.

In an effort to increase or improve the coverage area provided by base stations, relay stations have been introduced. Relay stations are associated with a given base station and act as liaisons between the mobile stations within the coverage area of the relay stations and the base station. For downlink communications, data may be transmitted from the base station to a relay station and from the relay station to the mobile station. For uplink communications, data may be transmitted from the mobile station to a relay station and from the relay station to the base station. As such, the uplink or downlink path may have multiple hops, and multiple relay stations may be provided in the uplink or downlink path. Even when relay stations are employed, mobile stations and base stations may also communicate directly, if the mobile stations are within communication range of the base stations.

As the demand for broadband access over wireless communication networks increases, so too does the demand for different types of networks that can accommodate high speed wireless networking. For example, the deployment of IEEE 802.11-based wireless networks in homes and business to create Internet access "hot spots" has become prevalent in today's society. However, these IEEE 802.11-based wireless networks are relatively limited in bandwidth as well as communication distance. Thus, these IEEE 802.11-based wireless networks are not good candidates for cellular implementations to provide continuous coverage over extended areas.

In an effort to increase bandwidth and communication distance for longer range wireless networking, the family of IEEE 802.16 standards has been developed for next generation wireless communications systems that are cellular based. The IEEE 802.16 standards are often referred to as WiMAX, and provide a specification for fixed broadband wireless metropolitan access networks (MANs) that use a point-to-multipoint architecture. Such communications can be implemented, for example, using Orthogonal Frequency Division Multiplexing (OFDM) communication. OFDM communication uses a spread spectrum technique to distribute the data over a large number of carriers that are spaced apart at precise frequencies.

The IEEE 802.16 standards support high bit rates in both uplink and downlink communications up to a distance of about 30 miles (~50 km) to handle such services as Voice over Internet Protocol (VoIP), IP connectivity and other voice, media, and data applications. Expected data throughput for a typical WiMAX network is 45 MBits/sec per channel. IEEE 802.16 networks, such as IEEE 802.16j networks, can be deployed as multi-hop networks employing relay stations to act as liaisons between base stations and mobile stations and further extend the effective coverage areas of the associated base stations.

For multi-hop networks, including those employing the IEEE 802.16 standards, the use of relay stations has resulted in various security risks. In general, traffic content delivered between a base station and a mobile station is generally encrypted using a key that is not available to the relay stations. As such, the relay stations only perform a forwarding function. However, the control information, including information bearing on what resources the relay stations should use for communications and how the relay stations should use those resources, is not protected. As such, malicious nodes posing as relay stations may intercept, modify, and re-transmit control information to interfere with normal network operation by disrupting the network, jamming particular relay stations, rerouting traffic content, and the like.

Accordingly, there is a need for secure techniques to employ relay stations in multi-hop networks, such that the relay stations are less susceptible to inappropriate control and malicious attacks.

SUMMARY

The present invention relates to enhancing security in wireless communication networks that employ relay stations to facilitate communications between base stations and mobile stations. In one embodiment, resource information provided to one or more relay stations from a base station or another relay station is encrypted prior to being delivered to the one or more relay stations. Only authorized relay stations are allocated an appropriate key necessary to decrypt the resource information. As such, only appropriate relay stations are able to access and use the resource information to effect communications directly or indirectly between the base stations and the mobile stations. In certain embodiments, the resource information is delivered between the various base and relay stations using either unicast or multicast delivery techniques. In yet another embodiment, encrypted traffic content exchanged between a base station or relay station and a mobile station is further encrypted using a second level of encryption when passed between a base station and a relay station or between relay stations to improve the integrity of traffic content delivery.

For the present invention, the resource information may take various forms and will generally relate to the control, allocation, or use of wireless communication resources necessary to facilitate communications among base stations, relay stations, mobile stations, or any combination thereof.

These entities will communicate with each other to provide or exchange messages including resource information as necessary to achieve communication goals. Any information being transmitted is assumed to be carried within a message of some type, wherein the message may be dedicated to carrying the information or may be used to carry other information, including traffic content. Generally, the physical layer communication resources, such as radio frequency carriers, sub-carriers, or pseudo-noise codes, are used alone or in groups to form logical communication channels, including sub-channels.

The resource information may identify the physical layer communication resources, such as the sub-carriers, or the logical communication channels to use for certain communications, provide control or scheduling information for using the physical layer communication resources or the logical communication channels, or a combination thereof. Physical layer parameters identifying how the physical layer communication resources are mapped to the logical communication channels may also be provided as resource information. Further, modulation information identifying the type of modulation being used for communications or how symbols are modulated may also be provided as resource information.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to enhancing security in wireless communication networks that employ relay stations to facilitate communications between base stations and mobile stations. In one embodiment, resource information provided to one or more relay stations from a base station or another relay station is encrypted prior to being delivered to the one or more relay stations. Only authorized relay stations are allocated an appropriate key necessary to decrypt the resource information. As such, only appropriate relay stations are able to access and use the resource information to effect communications directly or indirectly between the base stations and the mobile stations. In another embodiment, encrypted traffic content exchanged between a base station or relay station and a mobile station is further encrypted using a second level of encryption when passed between a base station and a relay station or between relay stations to improve the integrity of traffic content delivery. The details associated with these and other embodiments are provided further below after an overview of a communication system that employs relays stations.

Figure 1:
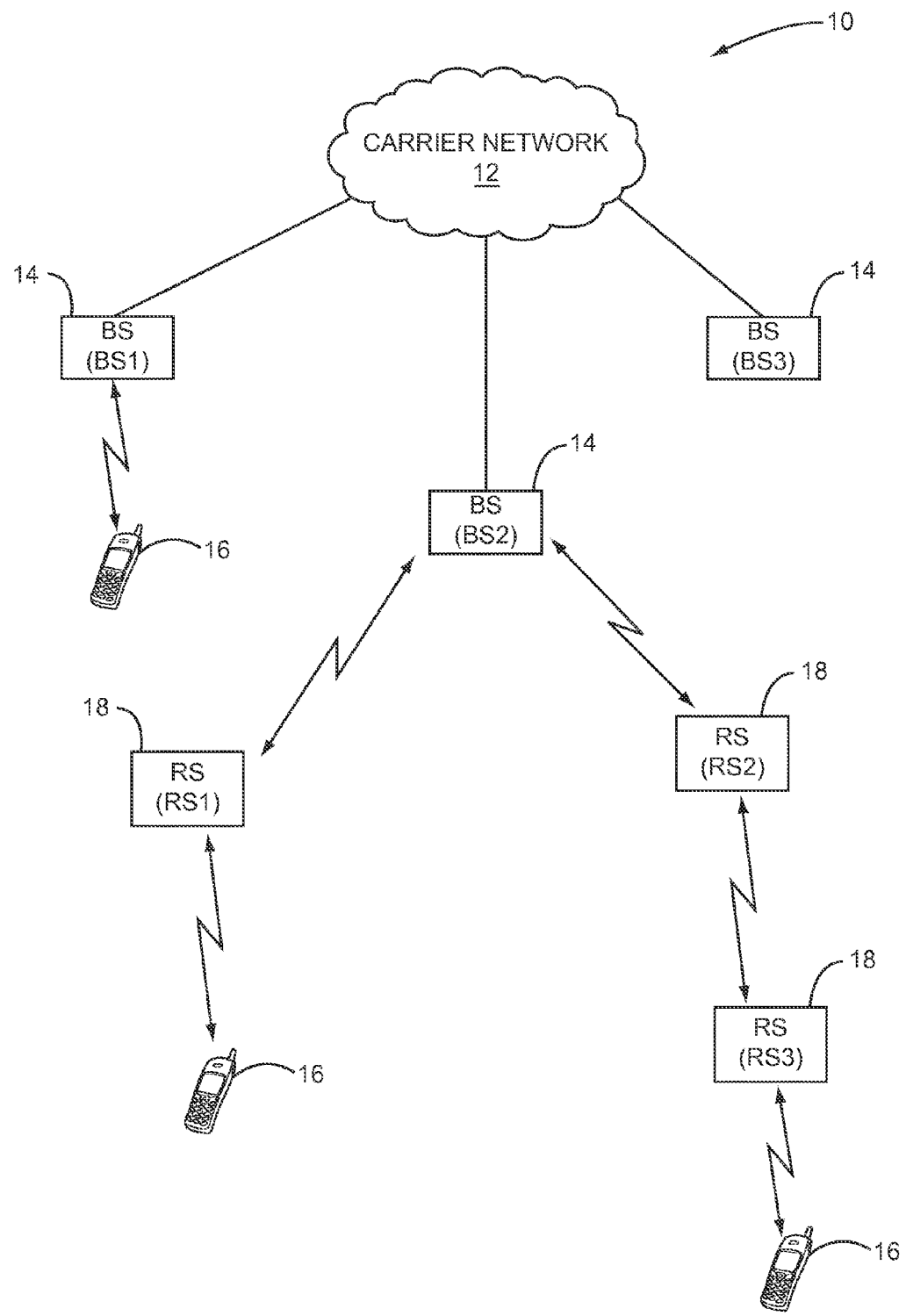
FIG. 1 is a wireless communication environment according to one embodiment of the present invention.

With reference to FIG. 1, an exemplary communication environment 10 is illustrated, wherein a basic carrier network 12 supports multiple base stations (BS) 14. In general, the base stations 14 are capable of facilitating wireless communications with any mobile station 16 that is within an available communication range directly or via one or more relay stations (RS) 18. Notably, the mobile station 16 may be located in an area that inhibits, and possibly even prohibits, direct communications with a base station 14, and as such, communications may be passed through a relay station 18 that is within communication range of the mobile station 16. Base stations are referenced as 14 when discussed in general and as BSn when discussed in particular, where n is a unique identifier of the particular base station 14. Similarly, relay stations are referenced as 18 when discussed in general and as RSn when discussed in particular, where n is a unique identifier of the particular relay station 18. Of the three base stations BS1, BS2, and BS3 illustrated in FIG. 1, base station BS2 is associated with numerous relay stations RS1, RS2, and RS3. Given the location of the mobile stations 16, a first mobile station 16 may communicate directly with the base station BS1, a second mobile station 16 may communicate indirectly with the base station BS2 through relay station RS1, and a third mobile station 16 may communicate indirectly with the base station BS2 through relay stations RS2 and RS3.

Base stations 14 and relay stations 18 are access points and may support any wireless communication techniques with each other as well as with mobile stations 16. Relay stations 18 that have a direct link to an associated base station 14 are considered children of the associated base station. As such, relay stations RS1 and RS2 are children of base station BS2. Relay stations 18 may also be children of parent relay stations 18. As illustrated, relay station RS3 is a child of relay station RS2, which acts a parent for relay station RS3 and a child of base station. BS2. A base station 14 and the relay stations 18 that are directly or indirectly supported by the base station 14 form an access point set. Thus, base station BS2 and relay stations RS1, RS2, and RS3 form an access point set in the illustrated example. This particular access point set is used extensively throughout the following disclosure to describe aspects of the various embodiments of the present invention.

In most multiple access communication networks where communications with multiple mobile stations 16 are supported at any given time, communications between base stations 14, relay stations 18, and mobile stations 16 must be coordinated within the available communication resources. In many environments, these communications are coordinated by generating a schedule that identifies the resources to use for communications and when to communicate using the resources. Scheduling information is then provided to the affected entities and used accordingly. The scheduling information may control communications between a base station 14 and a relay station 18, between a base station 14 and a mobile station 16, between relay stations 18, and between a relay station 18 and a mobile station 16. In addition to scheduling resources for communicating data, audio, video, or voice traffic between a base station 14 or relay station 18 and a mobile station 16, resources are scheduled for communicating control information, which may include scheduling information or other resource information, among the base stations 14, relay stations 18, and mobile stations 16.

Figure 2:
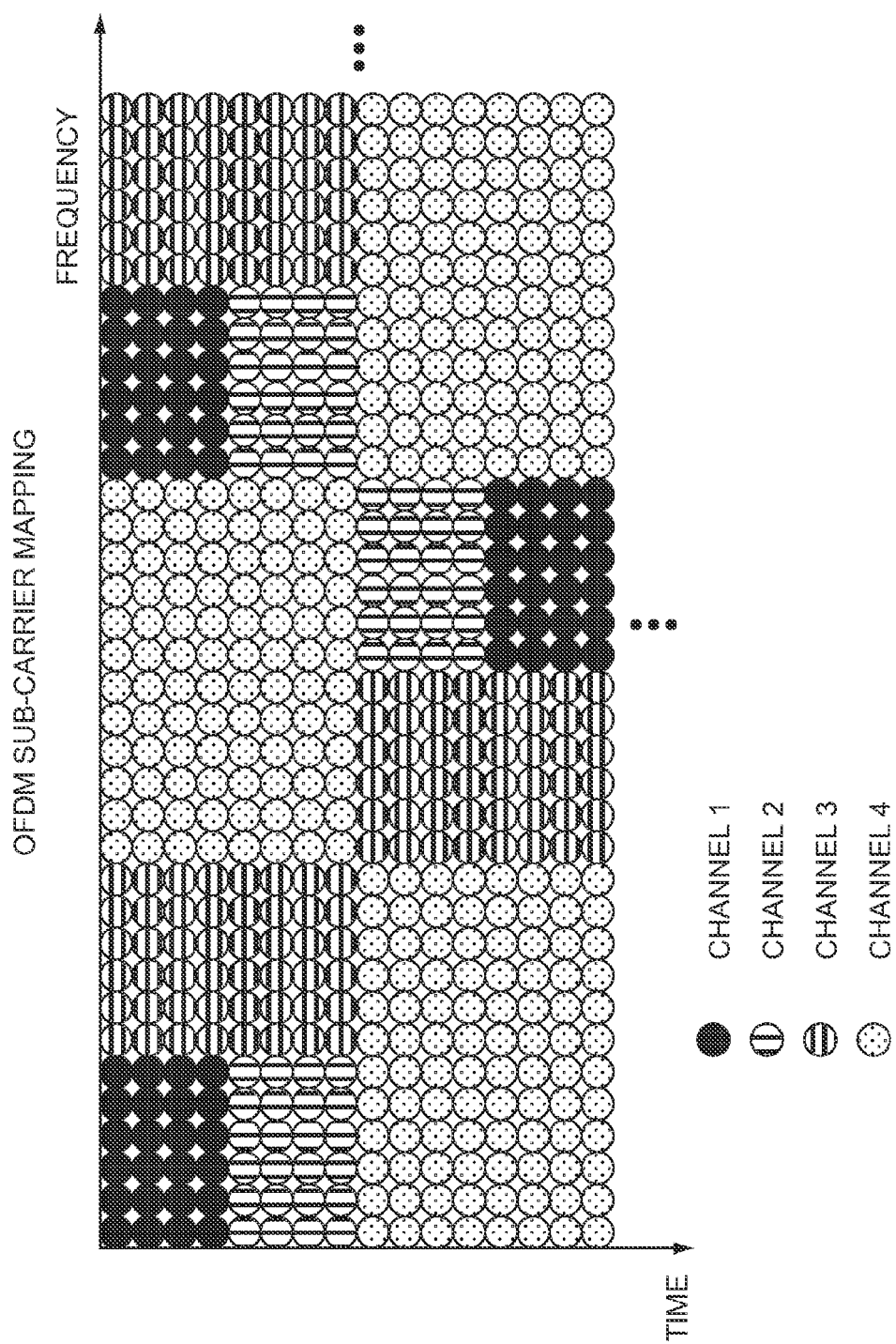
FIG. 2 illustrates the mapping of sub-carriers in an OFDM environment to logical communication channels according to one embodiment of the present invention.

For the present invention, the resource information may take various forms and will generally relate to the control, allocation, or use of wireless communication resources necessary to facilitate communications among the base stations 14, relay stations 18, and mobile stations 16. These entities will communicate with each other to provide or exchange messages including resource information as necessary to achieve communication goals. For the purposes of discussion, any information being transmitted may be carried within a message of some type, wherein the message may be dedicated to carrying the information or may be used to carry other information, including user or access control traffic content. Generally, the physical layer communication resources, such as radio frequency carriers, sub-carriers, or pseudo-noise codes, are used alone or in groups to form logical communication channels, including sub-channels. For example and with reference to FIG. 2, the physical sub-carriers along the time and frequency domains for an orthogonal frequency divisional multiple access (OFDM) system is illustrated. Each circle represents a unique sub-carrier onto which an OFDM symbol is modulated during any given time slot, which may extend over numerous sub-carriers along the time domain. Given the large number of available sub-carriers, groups of sub-carriers are often associated to form logical communications channels. In the illustrated example, five logical communication channels are defined where each channel includes numerous sub-carriers along the time and frequency domains.

The resource information may identify the physical layer communication resources, such as the sub-carriers, or the logical communication channels to use for certain communications, provide control or scheduling information for using the physical layer communication resources or the logical communication channels, or a combination thereof. Physical layer parameters identifying how the physical layer communication resources are mapped to the logical communication channels may also be provided as resource information. Further, modulation information identifying the type of modulation being used for communications or how symbols are modulated may also be provided as resource information.

Within an access point set, communication control may be centralized at the base station 14 or distributed among the base stations 14 and those relay stations 18 that act as parent access points. For the access point set of FIG. 1, centralized control may reside in the base station BS2 whereas distributed control may be spread among the base station BS2 and the relay station RS2, which act as parent access points for relay station RS2 and relay station RS3, respectively. For a centralized control environment, base station BS2 controls the allocation of resources, among other things, for relay stations RS1, RS2, and RS3. For a distributed control environment, the base station BS2 controls the allocation of resources, among other things, for relay stations RS1 and RS2. Relay station RS2 controls the allocation of resources, among other things, for relay station RS3.

In either centralized or distributed control environments, resource information transmitted from one access point to another may be encrypted to protect the resource information from being received by malicious nodes. The resource information is encrypted by a sender and decrypted by a receiver using an appropriate key, which is unlikely to be accessible by malicious nodes. For each hop or link between a base station 14 and a relay station 18 or between relay stations 18, the same or different key may be used to protect the resource information. If there are one or more intermediate relay stations 18 between a base station 14 (or parent relay station 18) and a child relay station 18 for which the resource information is pertinent, the intermediate relay stations 18 may be configured to simply pass encrypted resource information to the child relay station 18 without decrypting and re-encrypting the resource information. Alternatively, each intermediate relay station 18 may decrypt the resource information using a first key associated with upstream hop and then re-encrypt the resource information using a second key associated with the downstream hop. If the second hop leads to the child relay station 18, the child relay station 18 will use the second key to decrypt and recover the resource information.

Figure 3:
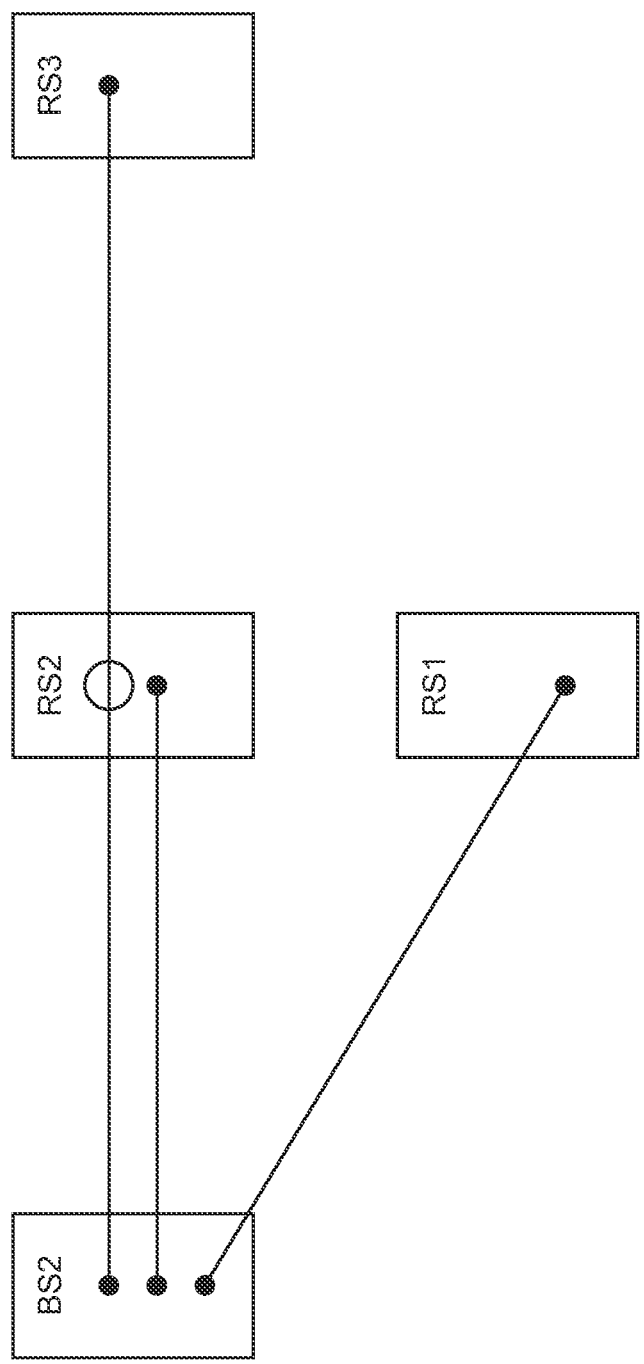
FIG. 3 illustrates a centralized control scenario employing unicast delivery of information according to one embodiment of the present invention.

With reference to FIG. 3, a centralized control environment is illustrated where control is centralized at the base station BS2 and the resource information is delivered to relay stations RS1, RS2, and RS3 directly or indirectly using unicast delivery by base station BS2. Unicast delivery is generally defined as communications from a single sender and intended for a single destination. As illustrated, resource information is individually unicast from the base station BS2 to relay stations RS1, RS2, and RS3, respectively, preferably using unique addresses that are associated with each of the relay stations RS1, RS2, and RS3.

The resource information for each relay station RS1, RS2, and RS3 may each be encrypted using a different encryption key, which is essentially known only to the access points associated with the particular single or multiple hop connection. Notably, the resource information sent to relay stations RS1 and RS2 is delivered directly over a single hop in separate messages that are directed to the respective relay stations 18. The resource information sent to relay station RS3 is delivered over multiple hops through relay station RS2, which may simply forward the resource information to the relay station RS3. Once the resource information is received, each of the respective relay stations RS1, RS2, and RS3 may decrypt and recover its respective resource information using the corresponding keys that corresponds to the given connection.

In any of the disclosed embodiments, the resource information may allocate communication resources for the upstream hop and/or the downstream hop for any uplink and downlink communications associated with these hops. The resource allocation may also be used to allocate resources for control information, including delivery of subsequent resource information. The keys may be generated in the same fashion and by the same or similar functions as keys used to encrypt traffic content. For example, communications may be provided in accordance with the IEEE 802.16e standards, which are incorporated herein by reference in their entirety. In this embodiment, the keys are generated in the same fashion as the traffic encryption keys in the IEEE 802.16e standards.

Upon network entry, a relay station 18 may obtain an authentication key through an authentication process with a parent access point, such as the base station BS2 or relay station RS2 in the case of relay station RS3. Initial resource allocation for initial communications may be derived from the authentication key or a traffic encryption key generated by the parent and child access points. Once communications are initiated, different keys and resource information may be distributed or generated on a systematic basis to protect communications.

Figure 4:
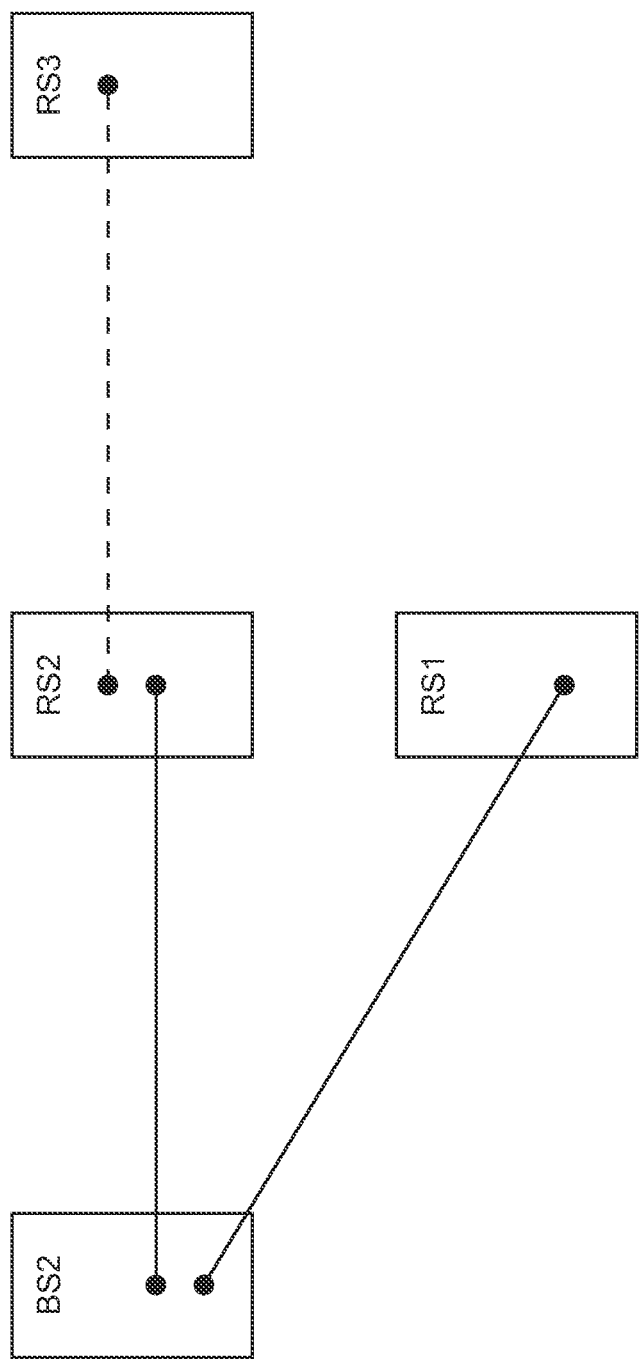
FIG. 4 illustrates a distributed control scenario employing unicast delivery of information according to one embodiment of the present invention.

With reference to FIG. 4, a distributed control environment is illustrated where control is distributed among parent access points, which in this example are base station BS2 and relay station RS2. Base station BS2 is the parent access point for relay stations RS1 and RS2. Relay station RS2 acts as a parent access point for relay station RS3. Resource information for relay stations RS1 and RS2 is generated by the base station BS2 and unicast to relay stations RS1, RS2, respectively, using unique addresses that are associated with relay stations RS1 and RS2. Based on relay station RS2's resource information or other criterion, relay station RS2 will generate further resource information for any child access point, which in this case is relay station RS3. The resource information for relay station RS3 is individually unicast from the relay station RS2 to relay station RS3 using a unique address that is associated with relay station RS3.

The resource information for each relay station RS1, RS2, and RS3 may each be encrypted using a different encryption key, which is essentially known only by the access points associated with the particular connection. Notably, the resource information sent to relay stations RS1 and RS2 is delivered directly over a single hop in separate messages that are directed to the respective relay stations RS1 and RS2. Further, the resource information sent to relay station RS3 from relay station RS2 is delivered directly over a single hop in yet another message that is directed to relay station RS3. Once the resource information is received, each of the respective relay stations RS1, RS2, and RS3 may decrypt and recover its respective resource information using the corresponding keys. Those skilled in the art will recognize that additional relay stations 18 may be provided in the illustrated environment to create multiple hop connections between access points. These additional access points may or may not act as control points in a distributed control scheme.

Figure 5:
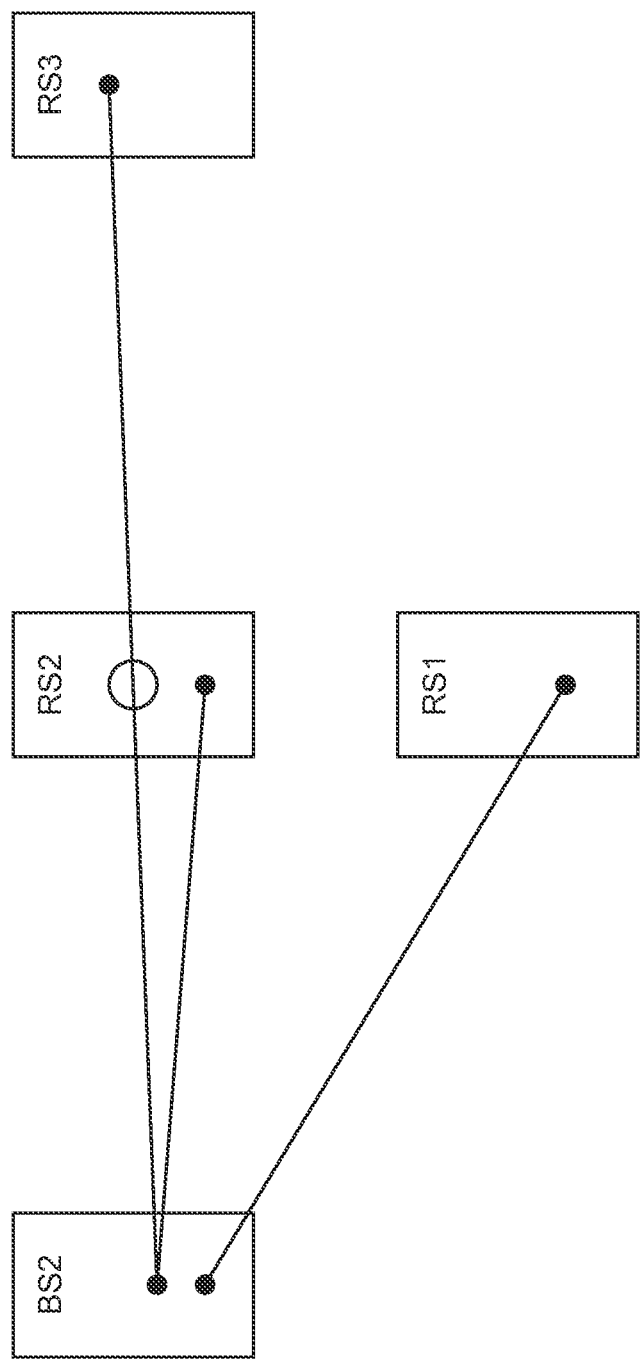
FIG. 5 illustrates a centralized control scenario employing multicast delivery of information according to one embodiment of the present invention.

With reference to FIG. 5, a centralized control environment is illustrated where control is centralized at the base station BS2 and the resource information is delivered to relay stations RS1, RS2, and RS3 directly or indirectly using multicast delivery by base station BS2. In contrast with unicast delivery, multicast delivery is generally defined as communications from a single sender and intended for multiple destinations. As illustrated, resource information for relay stations RS1, RS2, and RS3 is generated by the base station BS2 and multicast to relay stations RS1, RS2, and RS3, respectively, using a single multicast address that is known by each of the relay stations RS1, RS2, and RS3. The relay stations RS1, RS2, and RS3 will use the multicast address to identify any multicast messages intended for them. Accordingly, each relay station RS1, RS2, and RS3 may receive the same message, which may include resource information for each of the relay stations RS1, RS2, and RS3. In one embodiment, a resource map (R-MAP) for use by the relay stations 18 is generated to include the resource information, such as resource allocations, for multiple relay stations 18. R-MAP may also include resource information for base station to relay station communications as well as for relay station to relay station communications. Upon recovering the R-MAP, each relay station 18 will identify its particular resource information from the overall resource information and react accordingly. The resource information for other relay stations 18 may be ignored. Notably, the R-MAP may be separate from or associated with a primary resource allocation MAP carrying resource allocations for the mobile stations. The location of the R-MAP may be provided by a primary resource allocation MAP or may be provided at a fixed location.

The resource information, such as the R-MAP, for the relay stations RS1, RS2, and RS3 may be encrypted using a common multicast group encryption key, which is essentially known only by those access points associated with a given multicast group. The multicast group may include all of the access points for the access point set or a subset thereof. As illustrated, the encrypted resource information sent to relay stations RS1 and RS2 are delivered directly over a single hop to the respective relay stations RS1 and RS2. The resource information sent to relay station RS3 is delivered over multiple hops through relay station RS2, which may simply forward the resource information to the relay station RS3. Once the resource information is received, each of the respective relay stations RS1, RS2, and RS3 may decrypt and recover the resource information using the multicast group encryption key. Again, once the resource information is recovered, each of the relay stations RS1, RS2, and RS3 can select and apply its pertinent resource information from the overall resource information.

Figure 6:
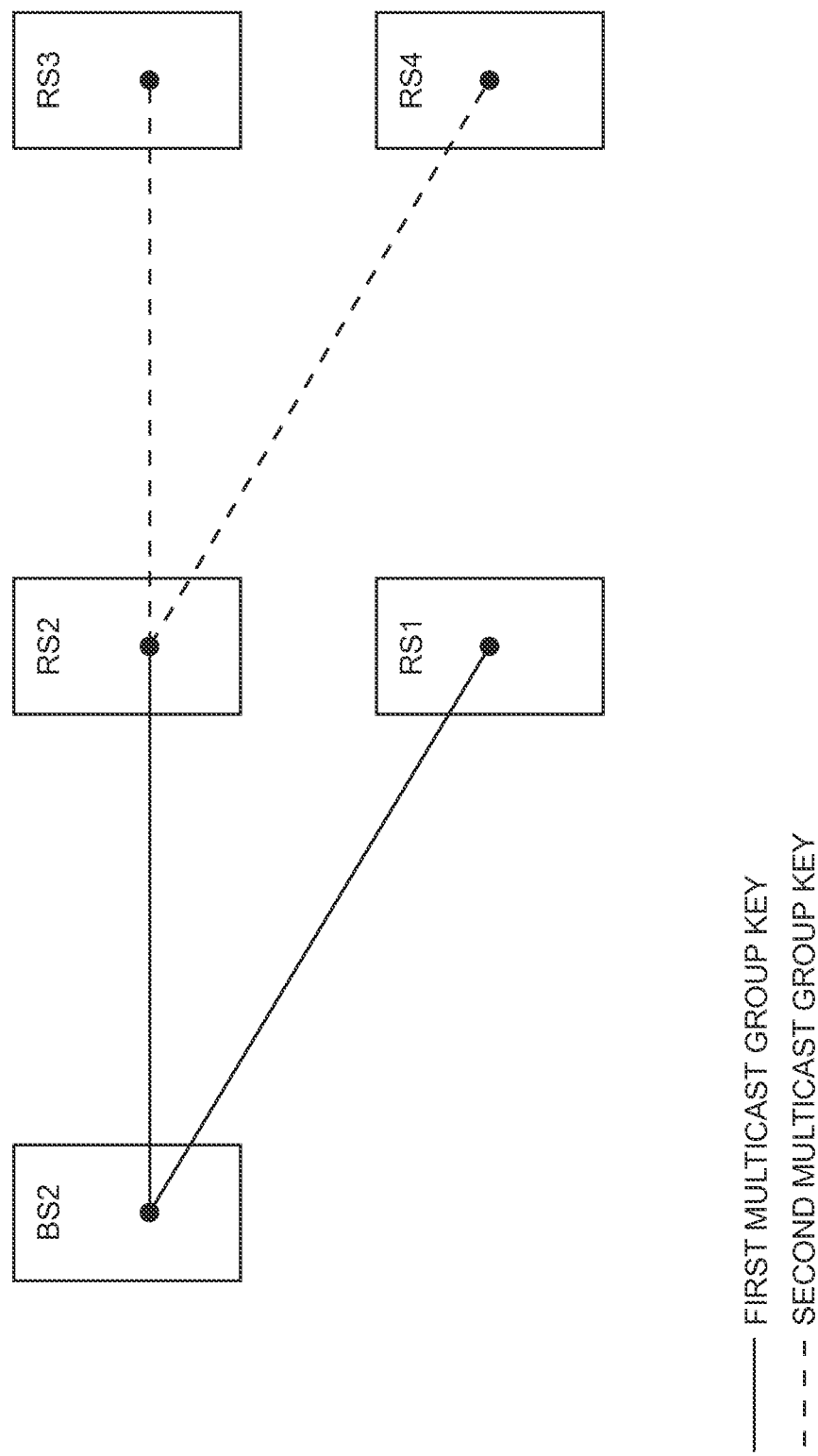
FIG. 6 illustrates a distributed control scenario employing multicast delivery of information according to one embodiment of the present invention.

With reference to FIG. 6, an environment with two multicast groups is illustrated. The first multicast group includes base station BS2 and relay stations RS1 and RS2 where links therebetween are protected by a first multicast group key. The second multicast group includes relay stations RS2, RS3, and RS4 where links therebetween are protected by a second multicast group key. Allocation of resources and the like is centralized at the base station BS2; however, relay station RS2 acts as a parent for relay stations RS3 and RS4. As such, resource information for relay stations RS1, RS2, RS3, and RS4 are initially encrypted using the first multicast group key and multicast to relay stations RS1 and RS2 using a first multicast address. Relay stations RS1 and RS2 will decrypt the resource information using the first multicast group key. From the decrypted resource information, each of the relay stations RS1 and RS2 will select and apply its pertinent resource information. Further, RS2 will re-encrypt all or a portion of the decrypted resource information using the second multicast group key and multicast the re-encrypted resource information to the relay stations RS3 and RS4 using a second multicast address. Relay stations RS3 and RS4 will decrypt the re-encrypted resource information using the second multicast group key. From the decrypted resource information, each of the relay stations RS3 and RS4 will select and apply its pertinent resource information.

From the above, resource information may be generated and disseminated within an access point set in a centralized or distributed fashion. This resource information is generally encrypted and either multicast to a group of access points or unicast to a specific access point, which may use or forward the resource information as necessary. The same or similar keys used to encrypt the resource information may be used to protect any type of information being transmitted over a given hop (or link) between access points or along a multi-hop path, which encompasses multiple hops though one or more intermediate access points. The information may range from resource information to other types of control information as well as traffic content that flows in any direction. Accordingly, all of the hops and paths between access points in the above illustrations may employ encryption to protect certain or all information that is exchanged over a hop or along a multi-hop path.

In many environments, such as IEEE 802.16e environments, traffic content is encrypted using a traffic encryption key and is either delivered from the mobile station 16 to the base station 14 or from the base station 14 to the mobile station 16 directly or indirectly though one or more relay stations 18. Generally, the base station 14 and the mobile station 16 are aware of the traffic encryption key or keys necessary to encrypt and decrypt the traffic content; however, the relay stations 18 may not have access to the traffic encryption key. Thus, the relay stations 18 simply forward the traffic content between the base station 14 and the mobile station 16 in tight of available resource information that relates to communications between the different access points as well as between the mobile station 16 and the relay station 18 that is serving the mobile stations 16.

Figure 7:
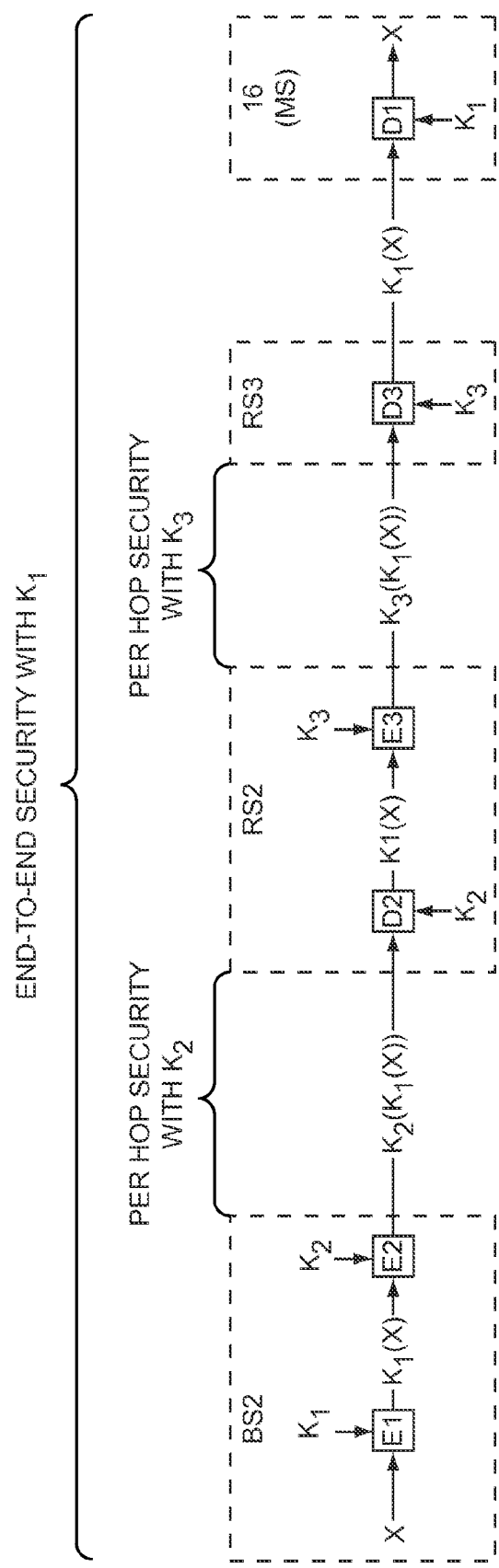
FIG. 7 illustrates a multi-tier security scenario on a per hop basis according to one embodiment of the present invention.

In another embodiment of the present invention, encrypted traffic content may be further encrypted on a per-hop basis or along a multi-hop path between access points using the same or similar keys that are used to protect any control information, including resource information that is exchanged between the access points. These concepts apply to broadcast, multicast, and unicast delivery. With reference to FIG. 7, a per-hop security example is provided where the hop between base station BS2 and relay station RS2 is protected using key $K_2$ and the hop between relay stations RS2 and RS3 is protected using key $K_3$. Keys $K_2$ and $K_3$ may be used to protect any type of control information, including resource information, provided between the respective access points. As illustrated, keys $K_2$ and $K_3$ may also be used to encrypt or further encrypt control information or traffic content originated from or sent to the mobile station 16.

Assume that X represents traffic content or control information available at base station BS2 and to be delivered to the mobile station 16 via relay stations RS2 and RS3. Further assume that traffic content X is being delivered to the mobile station 16 and that base station BS2 will encrypt the traffic content X with key $K_1$, which is only known by the mobile station 16. Thus, traffic content X is encrypted with key $K_1$ to create first encrypted traffic content $K_1(X)$ in the base station BS2 by a first encryption function $E_1$. To provide an additional layer of security for the hop from base station BS2 to relay station RS2, the first encrypted traffic content $K_1(X)$ is further encrypted using the key $K_2$ by encryption function $E_2$ to provide second encrypted traffic content $K_2(K_1(X))$, which is transmitted from base station BS2 to relay station RS2. Upon receipt at the relay station RS2, the second encrypted traffic content $K_2(K_1(X))$ is decrypted by decryption function $D_2$ using key K2 to recover the first encrypted traffic content $K_1(X)$.

For relay station RS2 to provide an additional layer of security for the hop from relay station RS2 to relay station RS3, the first encrypted traffic content $K_1(X)$ is further encrypted using the key $K_3$ by encryption function $E_3$ to provide third encrypted traffic content $K_3(K_1(X))$, which is transmitted from relay station RS2 to the relay station RS3. Upon receipt at the relay station RS3, the third encrypted traffic content $K_3(K_1(X))$ is decrypted by decryption function $D_3$ to recover the first encrypted traffic content $K_1(X)$, which is transmitted to mobile station 16. A decryption function $D_1$ of the mobile station 16 wilt decrypt the first encrypted traffic content $K_1(X)$ using the key $K_1$ to recover the traffic content X. As such, key $K_1$ provides end-to-end security, while keys $K_2$ and $K_3$ provide per-hop security. The process is reversed for traffic delivered from the mobile station 16 to the base station BS2. Further, control information may be protected on a per-hop or end-to-end basis in both directions between the base station BS2 and the mobile station 16 or between any of the respective access points.

Figure 8:
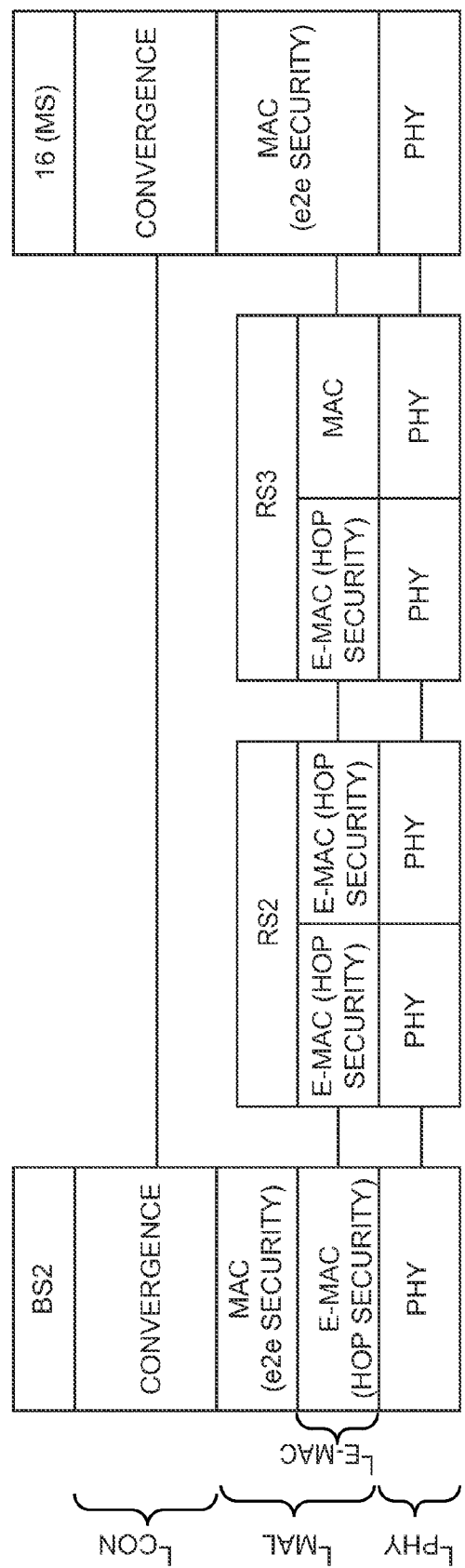
FIG. 8 is a protocol stack according to one embodiment of the present invention.

The various security levels may be provided at any protocol layer. For example and with reference to FIG. 8, the end-to-end. (e2e) security between the base station BS2 (or other access point) and the mobile station 16 (or other access point) may be provided in a primary media access control (MAC) layer $L_{MAC}$, while the per-hop security may be provided in an enhanced MAC (E-MAC) layer $L_{E-MAC}$ within or in close association with the primary MAC layer $L_{MAC}$. The enhanced E-MAC layer $L_{E-MAC}$ of each access point may be employed to provide the necessary encryption of the control information, including the resource information, as well as the second level of encryption for the end-to-end traffic or other content. The primary MAC layer $L_{MAC}$ and the enhanced MAC layer $L_{E-MAC}$ will reside between the physical (PHY) layer $L_{PHY}$ and a convergence, or transport, layer $L_{CON}$. The end-to-end security need not extend from the base station BS2 to the mobile station 16. In certain cases, the end-to-end security may extend between two communication access points over a multi-hop path.

Figure 9:
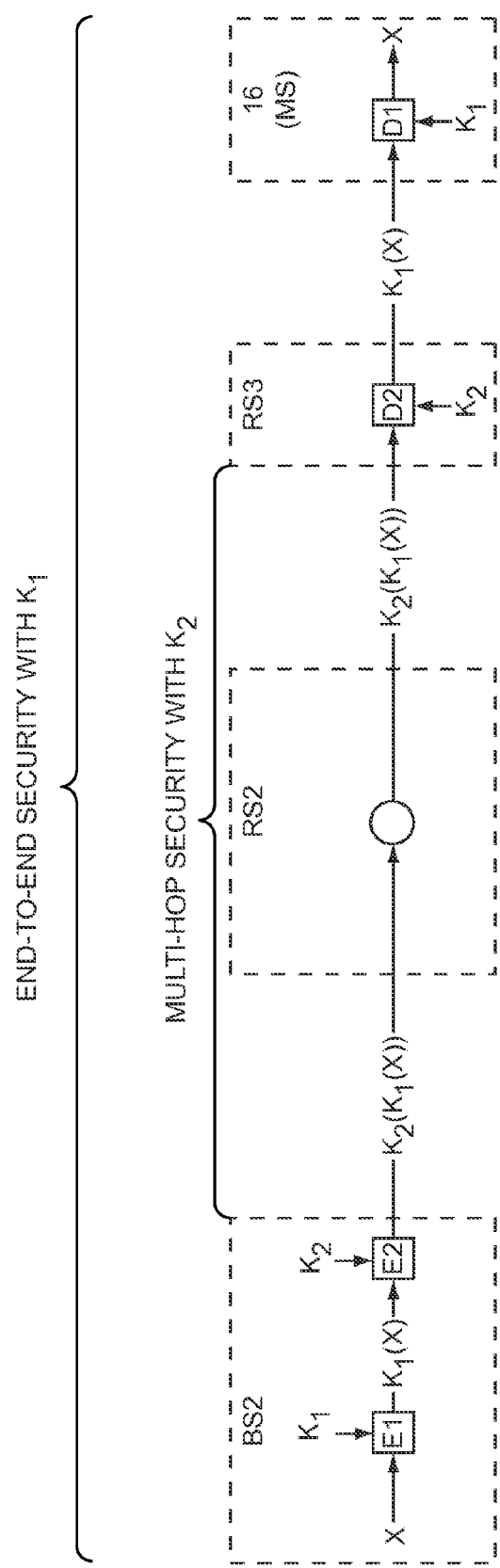
FIG. 9 illustrates a multi-tier security scenario on a multi-hop path basis according to one embodiment of the present invention.

With reference FIG. 9, an example is provided where a second level of security is provided over a multi-hop path instead of on a per-hop basis. The multi-hop path between base station BS2 and relay station RS3 extends through relay station RS2 and is protected using key $K_2$. Key $K_2$ may be used to protect any type of control information, including resource information, provided between the respective access points. Key $K_2$ may also be used to encrypt or further encrypt control information or traffic content originated from or sent to the mobile station 16.

Once again assume that X represents traffic content or control information available at base station BS2 and to be delivered to the mobile station 16 via relay stations RS2 and RS3. Further assume that traffic content X is being delivered to the mobile station 16 and that base station BS2 will encrypt the traffic content X with key $K_1$, which is only known by the mobile station 16. Thus, traffic content X is encrypted with key $K_1$ to create first encrypted traffic content $K_1(X)$ in the base station BS2 by a first encryption function $E_1$. To provide an additional layer of security for the multi-hop path from base station BS2 to relay station RS3 through relay station RS2, the first encrypted traffic content $K_1(X)$ is further encrypted using the key $K_2$ by encryption function $E_2$ to provide second encrypted traffic content $K_2(K_1(X))$, which is transmitted from base station BS2 to relay station RS2. Upon receipt at the relay station RS2, the second encrypted traffic content $K_2(K_1(X))$ is forwarded to relay station RS3 without processing. Relay station RS3 will receive the second encrypted traffic content $K_2(K_1(X))$ and employ decryption function $D_2$ and key $K_2$ to recover the first encrypted traffic content $K_1(X)$, which is transmitted to mobile station 16. The decryption function $D_1$ of the mobile station 16 will decrypt the first encrypted traffic content $K_1(X)$ using the key $K_1$ to recover the traffic content X. As such, key $K_1$ provides end-to-end security, while key $K_2$ provides multi-hop path hop security. The process is reversed for traffic delivered from the mobile station 16 to the base station BS2.

Figure 10:
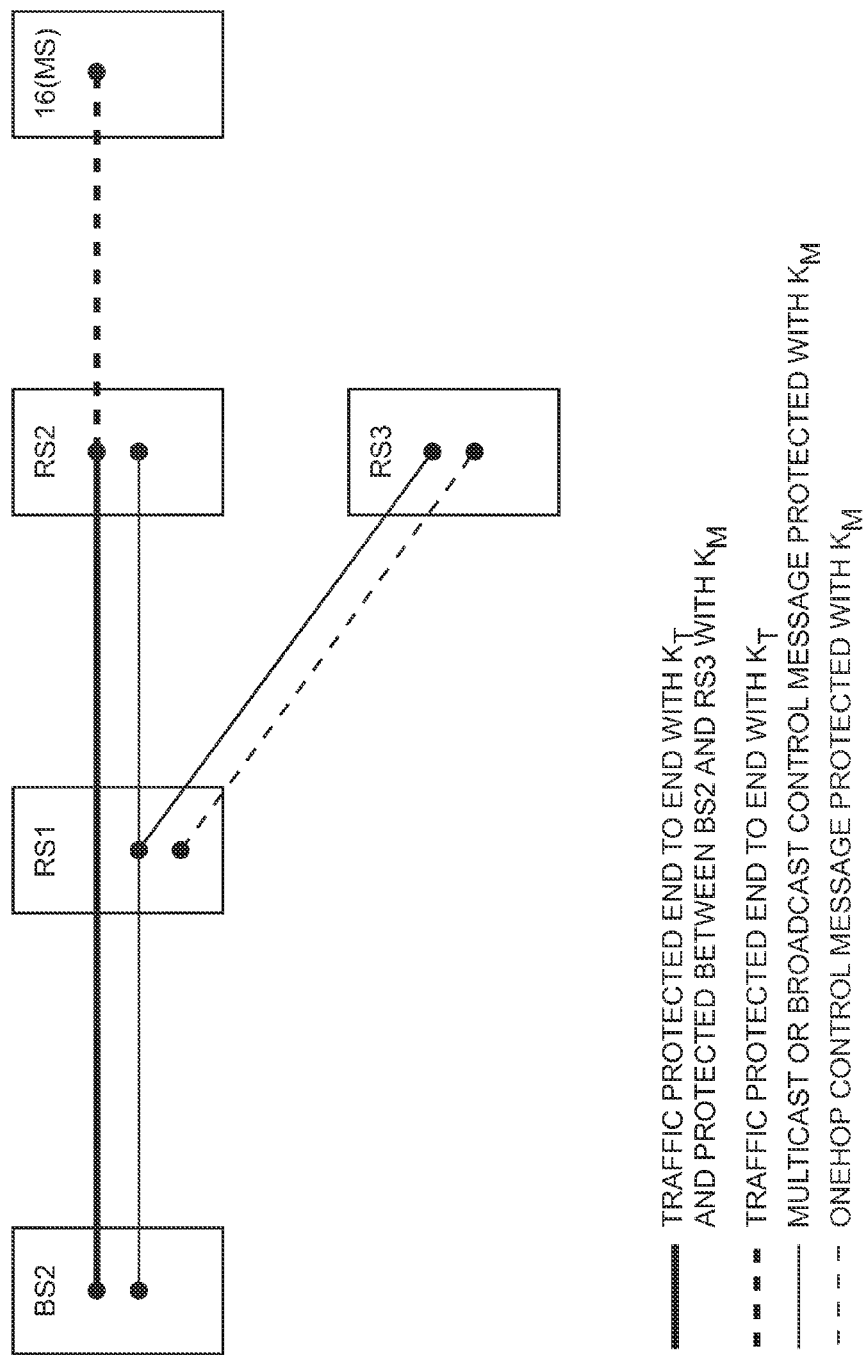
FIG. 10 illustrates a multi-tier security scenario employing unicast delivery according to one embodiment of the present invention.

The different concepts associated with the present invention may be employed alone or in various combinations within a given access point set. The following are two examples of these combinations. The first is provided a multicast group, while the second is provided in a unicast setting. With reference to FIG. 10, base station BS2 is the parent access point for relay station RS1, which is the parent access point for relay stations RS2 and RS3. Relay station RS2 is currently serving mobile station 16. The base station BS2 and relay stations RS1, RS2, and RS3 are part of a multicast group and have access to multicast key $K_M$. Traffic content is protected end-to-end between the base station BS2 and the mobile station 16 by encryption using a traffic encryption key $K_T$. The encrypted traffic content is further protected by encryption using the multicast key $K_M$ between the base station BS2 and the relay station RS2 through relay station RS1 on a per-hop or multi-hop path basis. Accordingly, the traffic content passed between relay station RS2 and mobile station 16 is not encrypted using the multicast key $K_M$, because the mobile station 16 is not part of the multicast group. Broadcast or multicast control information or messages are protected by encryption using the multicast key $K_M$ between base station BS2 and relay station RS2 through relay station RS1 as well as between base station BS2 and relay station RS3 through relay station RS1 on a per hop or multi-hop path basis. Unicast or multicast control information or messages are protected by encryption using the multicast key $K_M$ between relay station RS2 and relay station RS3 on a per-hop basis.

Figure 11:
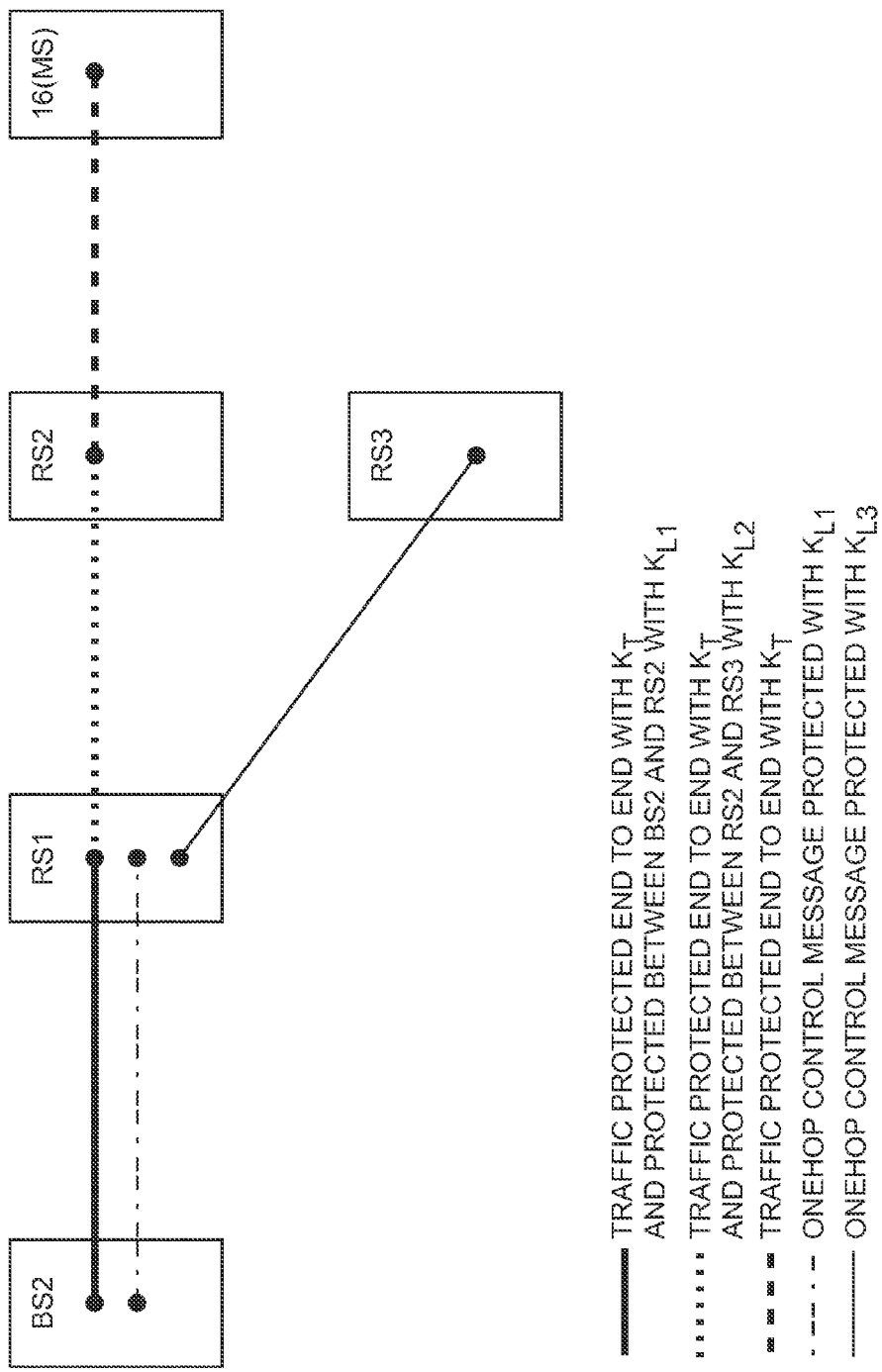
FIG. 11 illustrates a multi-tier security scenario employing multicast delivery according to one embodiment of the present invention.

With reference to FIG. 11, base station BS2 is the parent access point for relay station RS1, which is the parent access point for relay stations RS2 and RS3. Relay station RS2 is currently serving mobile station 16. The base station BS2 and relay stations RS1, RS2, and RS3 are part of an access point set that employs unicast delivery of control information. Each hop among the access points is protected by one of three localized keys $K_{L1}$, $K_{L2}$, $K_{L3}$. Key $K_{L1}$ is used for the hop between base station BS2 and the relay station RS1; key $K_{L2}$ is used for the hop between relay station RS1 and the relay station RS2; and key $K_{L3}$ is used for the hop between relay station RS1 and the relay station RS3. Traffic content is protected end-to-end between the base station BS2 and the mobile station 16 by encryption using a traffic encryption key $K_T$. The encrypted traffic content is further protected by encryption using the localized key $K_{L1}$ between base station BS2 and relay station RS1 and using the localized key $K_{L2}$ between relay station RS1 and relay station RS2 on a per-hop basis. Accordingly, the traffic content passed between the relay station RS2 and the mobile station 16 is not encrypted using one of the localized keys $K_{L1}$, $K_{L2}$, $K_{L3}$. As depicted, unicast control information or messages are protected by encryption using the localized key $K_{L1}$ between the base station BS2 and the relay station RS1, and using the localized key $K_{L3}$ between the relay station RS1 and the relay station RS3 on a per-hop basis.

Figure 12:
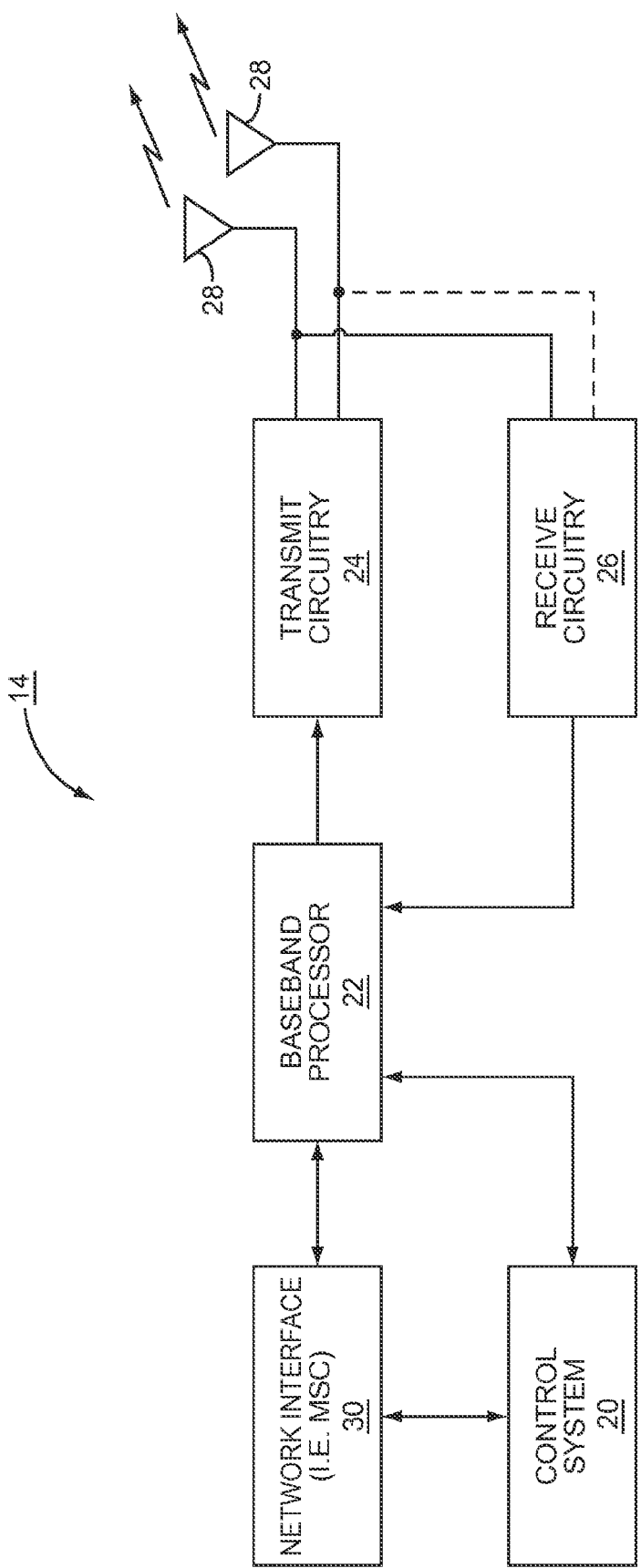
FIG. 12 is a block representation of a base station according to one embodiment of the present invention.

High level overviews of the mobile stations 16 and base stations 14 of the present invention are provided in following discussion. With reference to FIG. 12, a base station 14 configured according to one embodiment of the present invention is illustrated. The base station 14 generally includes a control system 20, a baseband processor 22, transmit circuitry 24, receive circuitry 26, one or more antennas 28, and a network interface 30. The receive circuitry 26 receives radio frequency signals bearing information from one or more remote transmitters provided by mobile stations 16 or relay stations 18. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs). The received information is then sent across a wireless network via the network interface 30 or transmitted to another mobile station 16 or relay station 18 serviced by the base station 14. The network interface 30 will typically interact with a base station controller and a circuit-switched network forming a part of the access network, which may be coupled to the public switched telephone network (PSTN) to form the carrier network 12.

On the transmit side, the baseband processor 22 receives digitized data, which may represent voice, data, or control information, from the network interface 30 under the control of control system 20, which encodes the data for transmission. The encoded data is output to the transmit circuitry 24, where it is modulated by a carrier signal having a desired transmit frequency or frequencies. A power amplifier (not shown) will amplify the modulated carrier signal to a level appropriate for transmission, and deliver the modulated carrier signal to the antennas 28 through a matching network (not shown). Modulation and processing details are described in greater detail below.

Figure 13:
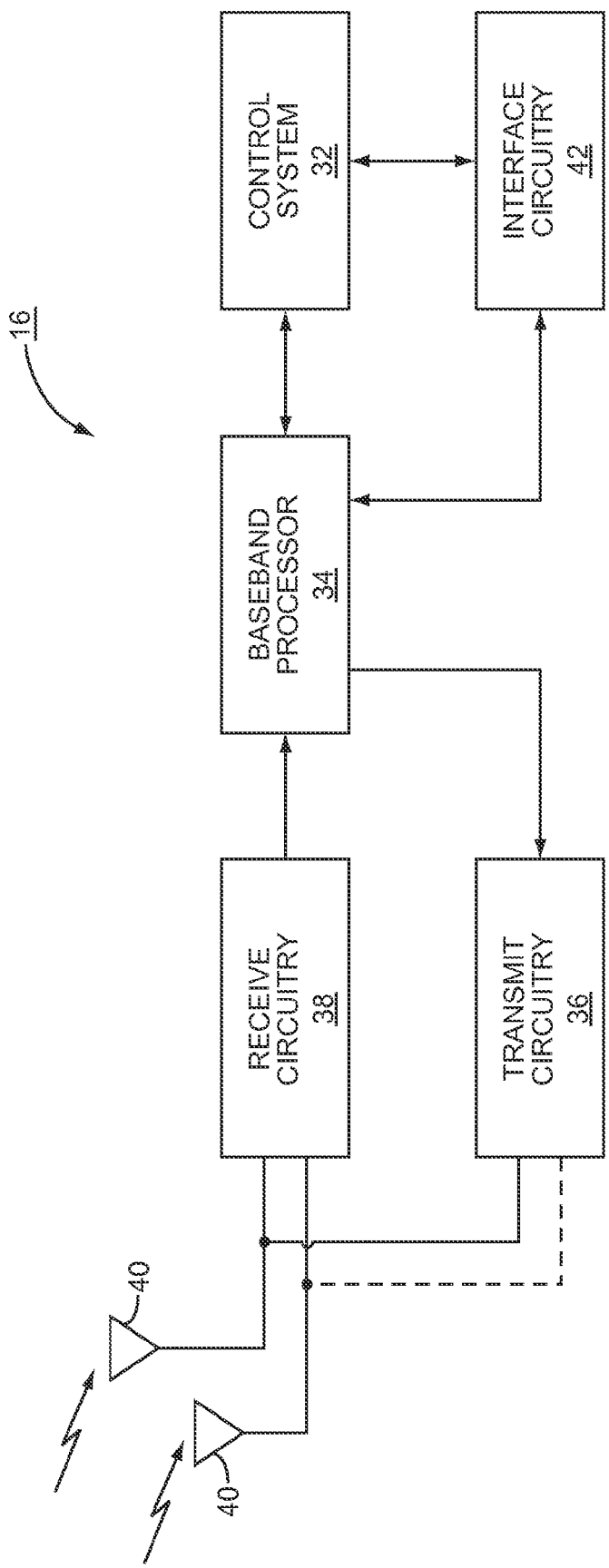
FIG. 13 is a block representation of a mobile station according to one embodiment of the present invention.

With reference to FIG. 13, a mobile station 16 configured according to one embodiment of the present invention is illustrated. Similarly to the base station 14, the mobile station 16 will include a control system 32, a baseband processor 34, transmit circuitry 36, receive circuitry 38, one or more antennas 40, and user interface circuitry 42. The receive circuitry 38 receives radio frequency signals bearing information from one or more base stations 14 or relay stations 18. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations, as will be discussed on greater detail below. The baseband processor 34 is generally implemented in one or more digital signal processors (DSPs) and application specific integrated circuits (ASICs).

For transmission, the baseband processor 34 receives digitized data, which may represent voice, data, or control information, from the control system 32, which it encodes for transmission. The encoded data is output to the transmit circuitry 36, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 40 through a matching network (not shown). Various modulation and processing techniques available to those skilled in the art are applicable to the present invention.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted parallel, the transmission rate for the digital data, or symbols, on any given carrier is lower than when a single carrier is used.

OFDM modulation generally employs an Inverse Fast Fourier Transform (IFFT) on the information to be transmitted. For demodulation, the performance of a Fast Fourier Transform (FFT) on the received signal is required to recover the transmitted information. In practice, the Inverse Discrete Fourier Transform (IDFT) and Discrete Fourier Transform (DFT) are implemented using digital signal processing for modulation and demodulation, respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In the preferred embodiment, OFDM is used at least for the downlink transmission from the base stations 14 or relay stations 18 to the mobile stations 16. Further, the base stations 14 are synchronized to a common clock via GPS signaling and coordinate communications via a base station controller. Each base station 14 may be equipped with n transmit antennas 28, and each mobile station 16 may be equipped with m receive antennas 40. Notably, the respective antennas can be used for reception and transmission using appropriate duplexers or switches and are so labeled only for clarity. Notably, the present invention is equally application to single antenna embodiments at the mobile station 16, relay stations 18, and the base stations 14.

Figure 14:
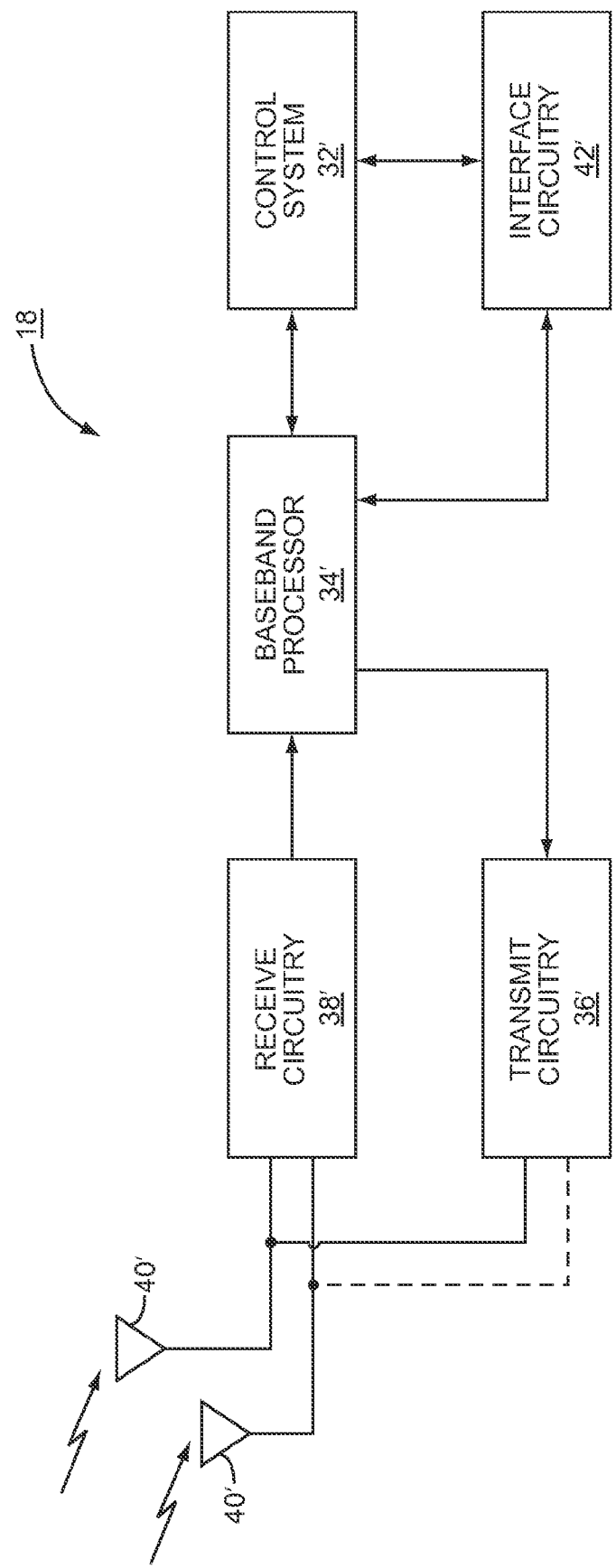
FIG. 14 is a block representation of a relay station according to one embodiment of the present invention.

With reference to FIG. 14, a relay station 18 configured according to one embodiment of the present invention is illustrated. Notably, the basic architecture of a relay station 18 is analogous to a mobile station 16, with the exception that the relay station 18 is able to communicate wirelessly with base stations 14 as well as mobile stations 16. Accordingly, the relay station 18 will include a control system 32', a baseband processor 34', transmit circuitry 36', receive circuitry 38', one or more antennas 40', and user interface circuitry 42'. The receive circuitry 38' receives radio frequency signals bearing information from one or more base stations 14 or mobile stations 16 and the transmit circuitry 36' transmits radio frequency signals to one or more base stations 14 or mobile stations 16. The baseband processor 34' and control system 32' operate in a fashion similar to the corresponding elements of the mobile station 16 and the base station 14.

Figure 15:
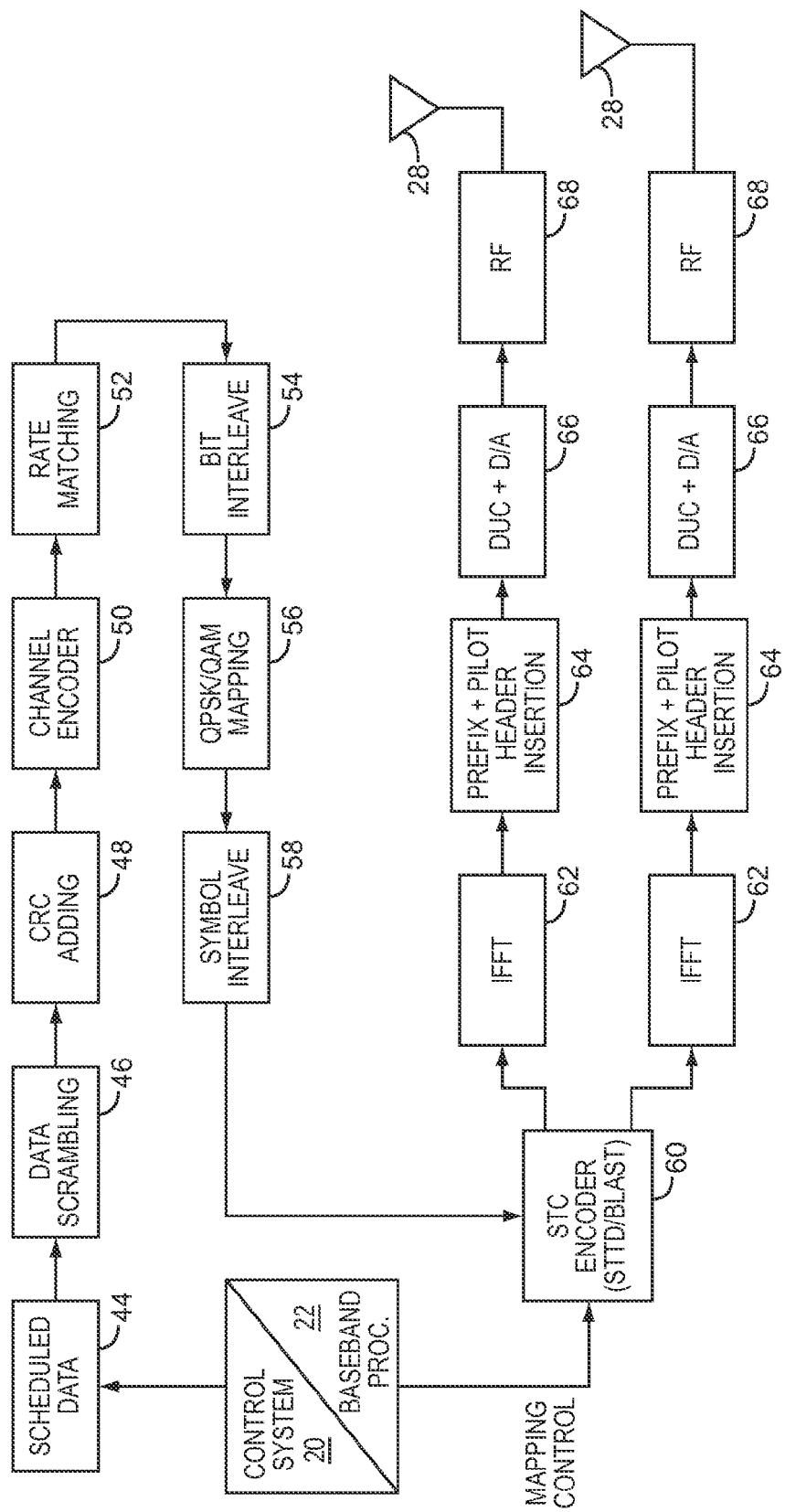
FIG. 15 is a logical breakdown of an OFDM transmitter architecture according to one embodiment of the present invention.

With reference to FIG. 15, a logical OFDM transmission architecture of a mobile station 16, base station 14, or relay station 18 is provided according to one embodiment. For clarity and conciseness, assume the following transmission architecture is in a base station 14. The data 44 to be transmitted is a stream of bits, which is scrambled in a manner reducing the peak-to-average power ratio associated with the data using data scrambling logic 46. A cyclic redundancy check (CRC) for the scrambled data is determined and appended to the scrambled data using CRC logic 48. Next, channel coding is performed using channel encoder logic 50 to effectively add redundancy to the data to facilitate recovery and error correction at the mobile station 16. The channel encoder logic 50 uses known Turbo encoding techniques in one embodiment. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. Blocks of symbols are then processed by space-time block code (STC) encoder logic 60, which modifies the symbols in a fashion making the transmitted signals more resistant to interference and more readily decoded at a mobile station 16. The STC encoder logic 60 will process the incoming symbols and provide n outputs corresponding to the number of transmit antennas 28 for the base station 14. The control system 20 and/or baseband processor 22 will provide a mapping control signal to control STC encoding. At this point, assume the symbols for the n outputs are representative of the data to be transmitted and capable of being recovered by the mobile station 16. See A. F. Naguib, N. Seshadri, and A. R. Calderbank, "Applications of space-time codes and interference suppression for high capacity and high data rate wireless systems," Thirty-Second Asilomar Conference on Signals, Systems & Computers, Volume 2, pp. 1803-1810, 1998, which is incorporated herein by reference in its entirety.

For the present example, assume the base station 14 has two antennas 28 (n=2) and the SIC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing alone or in combination with other processing described herein. The IFFT processors 62 will preferably operate on the respective symbols using IDFT or like processing to effect an inverse Fourier Transform. The output of the IFFT processors 62 provides symbols in the time domain. The time domain symbols are grouped into frames, which are associated with prefix and pilot headers by like insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted to via the RF circuitry 68 and antennas 28. Notably, the transmitted data is preceded by pilot signals, which are known by the intended mobile station 16 and implemented by modulating the pilot header and scattered pilot sub-carriers. The mobile station 16 may use the scattered pilot signals for channel estimation and interference suppression and the header for identification of the base station 14. Again, this architecture may be provided in relay stations 18 and mobile stations 16.

Figure 16:
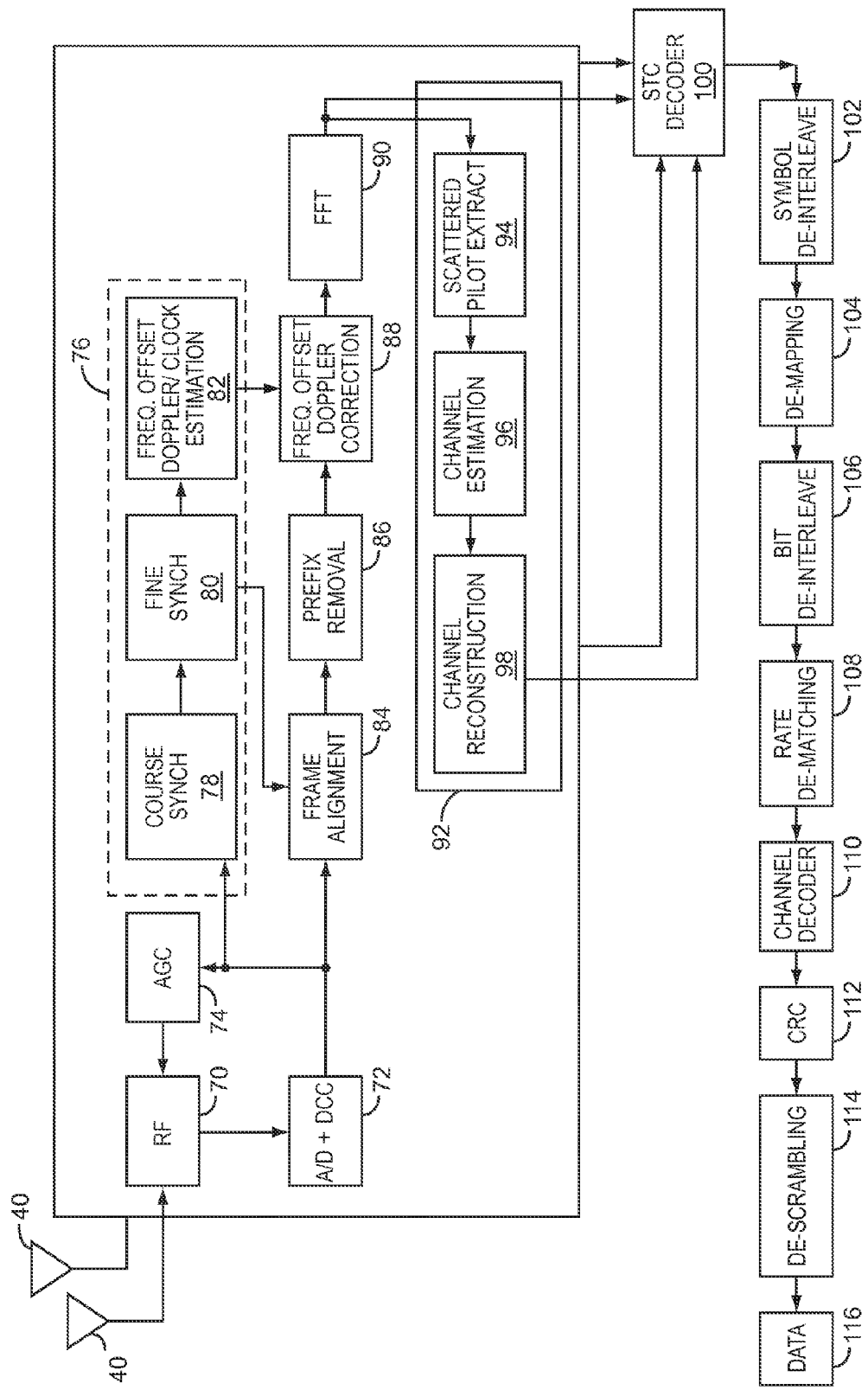
FIG. 16 is a logical breakdown of an OFDM receiver architecture according to one embodiment of the present invention.

Reference is now made to FIG. 16 to illustrate reception of the transmitted signals by a mobile station 16; however, the principles may be applied to a base station 14 or relay station 18. Upon arrival of the transmitted signals at each of the antennas 40 of the mobile station 16, the respective signals are demodulated and amplified by corresponding RF circuitry 70. For the sake of conciseness and clarity, only one of the two receive paths is described and illustrated in detail. Analog-to-digital (A/D) converter and down-conversion circuitry (DCC) 72 digitizes and downconverts the analog signal for digital processing. The resultant digitized signal may be used by automatic gain control circuitry (AGC) 74 to control the gain of the amplifiers in the RF circuitry 70 based on the received signal level.

Preferably, each transmitted frame has a defined structure having two identical headers. Framing acquisition is based on the repetition of these identical headers. Initially, the digitized signal is provided to synchronization logic 76, which includes coarse synchronization logic 78, which buffers several OFDM symbols and calculates an auto-correlation between the two successive OFDM symbols. A resultant time index corresponding to the maximum of the correlation result determines a fine synchronization search window, which is used by the fine synchronization logic 80 to determine a precise framing starting position based on the headers. The output of the fine synchronization logic 80 facilitates frame acquisition by the frame alignment logic 84. Proper framing alignment is important so that subsequent FFT processing provides an accurate conversion from the time to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and a resultant samples are sent to frequency offset and Doppler correction logic 88, which compensates for the system frequency offset caused by the unmatched local oscillators in the transmitter and the receiver and Doppler effects imposed on the transmitted signals. Preferably, the synchronization logic 76 includes frequency offset, Doppler, and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using the FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. The frequency domain symbols and channel reconstruction information for each receive path are provided to an SIC decoder 100, which provides STC decoding on both receive paths to recover the transmitted symbols. The channel reconstruction information provides the STC decoder 100 sufficient information to process the respective frequency domain symbols to remove the effects of the transmission channel.

The recovered symbols are placed back in order using the symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

While certain embodiments are discussed in the context of wireless networks operating in accordance with the IEEE 802.16 broadband wireless standard, which is hereby incorporated by reference, the invention is not limited in this regard and may be applicable to other broadband networks including those operating in accordance with other OFDM-based systems including the 3rd Generation Partnership Project ("3GPP") and 3GPP2 evolutions. Similarly, the present invention is not limited solely to OFDM-based systems and can be implemented in accordance with other system technologies, such as code division multiple access technologies or other frequency division multiple access technologies.

Those skilled in the art will recognize improvements and modifications to the preferred embodiments of the present invention. All such improvements and modifications are considered within the scope of the concepts disclosed herein and the claims that follow.

What is claimed is:

1. An access point for use in a multiple hop access point set comprising:
   at least one wireless communication interface; and
   a processor associated with the at least one wireless communication interface and adapted to:
   obtain resource information for communications to be supported by a child access point in the access point set, wherein the child access point provides a communication link between the access point and a mobile station;
   encrypt the resource information using a first key to create encrypted resource information, wherein the first key is known to the mobile station and unknown to the child access point and provides end-to-end security between the access point and the mobile station;
   further encrypting the encrypted resource information using a second key to create further encrypted resource information, wherein the second key is known to the child access point and provides per-hop security between the child access point and the mobile station; and initiate delivery of the further encrypted resource information to the child access point via the at least one wireless communication interface, wherein the further encrypted resource information is delivered over a single wireless communications hop to the child access point.

2. The access point of claim 1 wherein the access point is a relay station that is at least one wireless communications hop away from a base station, and the child access point is another relay station.

3. The access point of claim 1 wherein the access point is a base station and the child access point is a relay station that is at least one wireless communications hop away from the base station.

4. The access point of claim 1 wherein the further encrypted resource information is delivered over a plurality of wireless communications hops via at least one relay station to the child access point.

5. The access point of claim 1 wherein to initiate delivery of the further encrypted resource information, the processor is adapted to unicast the further encrypted resource information to the child access point.

6. The access point of claim 5 wherein the processor is further adapted to unicast different encrypted resource information to different child access points.

7. The access point of claim 6 wherein each of the different encrypted resource information for the different child access points is encrypted with a different key.

8. The access point of claim 1 wherein the resource information is used for communications to be supported by a plurality of child access points in the access point set, and to initiate delivery of the further encrypted resource information, the processor is adapted to multicast the encrypted resource information to the plurality of child access points.

9. The access point of claim 1 wherein the resource information comprises resource allocations for each of the plurality of child access points that are maintained in a resource allocation map, and to encrypt the resource information, the processor is further adapted to encrypt the resource allocation map using the first key.

10. The access point of claim 9 wherein the resource allocation map provides resource allocations for access points, and is different from a mobile station resource allocation map providing resource allocations for direct use by the mobile station.

11. The access point of claim 8 wherein the access point and at least the plurality of child access points form a multicast group and the processor is further adapted to:
gain entry into a network comprising the access point set; and
join the multicast group.

12. The access point of claim 1 wherein the resource information comprises resource allocations to use for the communications to be supported by the child access point.

13. The access point of claim 1 wherein the resource information comprises a mapping of physical layer resources to logical communication channels.

14. The access point of claim 13 wherein the resource information comprises a mapping of physical layer carriers or sub-carriers to logical communication channels or sub-channels.

15. The access point of claim 1 wherein the resource information comprises modulation information to use for the communications to be supported by the child access point.

16. The access point of claim 1 wherein information comprising the resource information is obtained over at least one wireless communication hop from a parent access point.

17. The access point of claim 16 wherein the processor is further adapted to decrypt the information to recover the resource information.

18. The access point of claim 1 wherein to obtain the resource information, the processor is further adapted to internally generate the resource information.

19. The access point of claim 1 wherein the processor is further adapted to effect delivery of encrypted traffic content intended for the mobile station to the child access point, wherein the encrypted traffic content is encrypted using a traffic encryption key that is different from the first key.

20. The access point of claim 19 wherein the processor is further adapted to further encrypt the encrypted traffic content with the first key.

21. An access point for use in a multiple hop access point set comprising:
at least one wireless communication interface; and
a processor associated with the at least one wireless communication interface and adapted to:
receive from a parent access point encrypted resource information for communications, wherein the encrypted resource information is received over a single wireless communications hop from the parent access point, the parent access point residing in the access point set, wherein the encrypted resource is encrypted by a first key known to the access point providing per-hop security between the access point and the mobile station and further encrypted by a second key known to a mobile station and unknown to the access point provides end-to-end security between the parent access point and the mobile station;
decrypt a portion of the encrypted resource information using a first key to obtain a portion of resource information;
apply the portion of the resource information for communications with at least one of the parent access point, a child access point, and the mobile station via the at least one wireless communication interface.

22. The access point of claim 21 wherein the access point is a relay station that is at least one wireless communications hop away from a base station.

23. The access point of claim 21 wherein the encrypted resource information is received via a plurality of wireless communications hops from the parent access point.

24. The access point of claim 21 wherein the encrypted resource information is received via unicast delivery from the parent access point.

25. The access point of claim 21 wherein the encrypted resource information is received via multicast delivery.

26. The access point of claim 25 wherein the portion of the resource information comprises resource allocations for each of a plurality of access points that are maintained in a resource allocation map, and to decrypt the portion of the resource information, the processor is further adapted to decrypt the resource allocation map using the first key.

27. The access point of claim 26 wherein the resource allocation map provides resource allocations for access points, and is different from a mobile station resource allocation map providing resource allocations for direct use by a mobile station.

28. The access point of claim 21 wherein the portion of the resource information comprises resource allocations to use for the communications.

29. The access point of claim 21 wherein the portion of the resource information comprises a mapping of physical layer resources to logical communication channels.

30. The access point of claim 29 wherein the portion of the resource information comprises a mapping of physical layer carriers or sub-carriers to logical communication channels or sub-channels.

31. The access point of claim 21 wherein the portion of the resource information comprises modulation information to use for the communications.

32. A method for use in a multiple hop access point set comprising:
- obtaining resource information for communications to be supported by a child access point in the access point set, wherein the child access point provides a communication link between the access point and a mobile station;
- encrypting the resource information using a first key to create encrypted resource information, wherein the first key is known to the mobile station and unknown to the child access point and provides end-to-end security between the access point and the mobile station;
- furthering encrypting the encrypted resource information using a second key to create further encrypted resource information, wherein the second key is known to the child access point and provides per-hop security between the child access point and the mobile station; and
- initiating delivery of the further encrypted resource information to the child access point via at least one wireless communication interface, wherein the further encrypted resource information is delivered over a single wireless communications hop to the child access point.

33. A method for use in a multiple hop access point set comprising:
- receiving from a parent access point encrypted resource information for communications, wherein the encrypted resource information is received over a single wireless communications hop from the parent access point, the parent access point residing in the access point set, wherein the encrypted resource is encrypted by a first key known to the access point providing per-hop security between the access point and the mobile station and further encrypted by a second key known to a mobile station and unknown to the access point provides end-to-end security between the parent access point and the mobile station;
- decrypting a portion of the encrypted resource information using a first key to obtain a portion of resource information;
- applying the portion of the resource information for communications with at least one of the parent access point, a child access point, and the mobile station via the at least one wireless communication interface.

* * * * *

UNITED STATES PATENT AND TRADEMARK OFFICE
CERTIFICATE OF CORRECTION

PATENT NO. : 9,510,190 B2
APPLICATION NO. : 13/766519
DATED : November 29, 2016
INVENTOR(S) : Zhang et al.

It is certified that error appears in the above-identified patent and that said Letters Patent is hereby corrected as shown below:

On the Title Page

Item (63) should be replaced with the following line:
"Continuation of application No. 12/307,695, filed on Jan. 6, 2009, now Pat. No. 8,468,338, which is a national stage entry of application No. PCT/IB2007/001892, filed on Jul. 6, 2007."

Signed and Sealed this
Eighth Day of May, 2018

Andrei Iancu
*Director of the United States Patent and Trademark Office*